(12) United States Patent
Chen

(10) Patent No.: US 12,489,945 B2
(45) Date of Patent: Dec. 2, 2025

(54) CLIENT-SIDE DECODING AND PLAYOUT AT CHANNEL CHANGES

(71) Applicant: Adeia Guides Inc., San Jose, CA (US)

(72) Inventor: Tao Chen, Palo Alto, CA (US)

(73) Assignee: Adeia Guides Inc., San Jose, CA (US)

( * ) Notice: Subject to any disclaimer, the term of this patent is extended or adjusted under 35 U.S.C. 154(b) by 197 days.

(21) Appl. No.: 18/226,455

(22) Filed: Jul. 26, 2023

(65) Prior Publication Data

US 2025/0039496 A1    Jan. 30, 2025

(51) Int. Cl.
*H04N 21/438*    (2011.01)
*H04N 19/114*    (2014.01)
*H04N 19/177*    (2014.01)

(52) U.S. Cl.
CPC ....... *H04N 21/4384* (2013.01); *H04N 19/114* (2014.11); *H04N 19/177* (2014.11)

(58) Field of Classification Search
CPC ............ H04N 21/4384; H04N 19/114; H04N 19/177; H04N 21/812; H04N 21/8455
USPC ......................................................... 725/38
See application file for complete search history.

(56) References Cited

U.S. PATENT DOCUMENTS

| | | | |
|---|---|---|---|
| 7,237,251 B1 * | 6/2007 | Oz ..................... | H04N 21/4384 |
| | | | 725/100 |
| 7,562,375 B2 * | 7/2009 | Barrett ................. | H04N 21/472 |
| | | | 725/38 |
| 8,111,971 B2 | 2/2012 | Akgul | |
| 8,542,705 B2 | 9/2013 | Johansson et al. | |
| 2014/0280784 A1 * | 9/2014 | Moroney ............ | H04L 65/1069 |
| | | | 709/219 |
| 2015/0237377 A1 | 8/2015 | Hendry et al. | |
| 2018/0302618 A1 | 10/2018 | Choi et al. | |

FOREIGN PATENT DOCUMENTS

| | | |
|---|---|---|
| EP | 2566154 A1 | 3/2013 |
| WO | 0130073 A1 | 4/2001 |

OTHER PUBLICATIONS

Adeliyi et al., "Reducing zapping delay in Internet protocol television using a hybrid modular method," Proc. Information Communication Technology and Society Conference (ICTAS), Durban, South Africa, 2019 (4 pages).

(Continued)

*Primary Examiner* — Adil Ocak
(74) *Attorney, Agent, or Firm* — HALEY GUILIANO LLP

(57) ABSTRACT

Methods and systems are described for generation of a smooth, engaging transition from one media source to another or from one portion of a media source to another portion of the media source. In response to a request to change display of content from a first source to a second source, a first decodable frame of the second source is determined before completion of decoding a first segment of the second source. During the decoding of the second source, a transition based at least in part on the first decodable frame of the second source is generated for display. In response to completion of the decoding of the first segment of the second source, the second source is displayed without the transition. Artificial intelligence systems, including neural networks, and models are utilized to improve the transition. Related apparatuses, devices, techniques, and articles are also described.

20 Claims, 11 Drawing Sheets

(56) References Cited

OTHER PUBLICATIONS

Akgul, "A client-based fast channel change technique using multiple decoder clocks,", IEEE Transactions on Consumer Electronics, 66(1):61-68 (2020).
Bross et al, "Overview of the versatile video coding (VVC) standard and its applications," IEEE Transactions on Circuits Systems for Video Technology, 31(10):29 pages (2021).
Edgeware TV Server, "Subsecond ZAP Time Fast Channel Change," Retrieved from www.edgeware.tv/products/tv-server on Jun. 20, 2023 (5 pages).
Fimic et al., "Reducing channel change time by system architecture changes in DVB-S/C/T set top boxes," IEEE Transactions on Consumer Electronics, 65(3):312-321 (2019).
HESP Alliance, "Introducing HESP Alliance," Retrieved from www.hespalliance.org on Jun. 13, 2023 (5 pages).
Joo, Hyunchul, et al "Fast/On-time Channel Zapping Scheme using a Cache Server over IPTV Multicast System." 2021 IEEE Industrial Electronics and Applications Conference (IEACon). IEEE, 2021.
Mattheyses et al., "On the importance of audiovisual coherence for the perceived quality of synthesized visual speech," EURASIP Journal of Audio, Speech, and Music Processing, Sep. 2009 (12 pages).
Sullivan et al, "Overview of the high efficiency video coding (HEVC) standard," IEEE Transactions on Circuits Systems for Video Technology, 22(12):20 pages (2012).
Wallendael et al., "Mixed-resolution HESP for more efficient fast channel switching and packet-loss repair," Proc. Picture Coding Symposium (PCS), 2022 (5 pages).
Wiegand et al, "Overview of the H.264/AVC video coding standard," IEEE Transactions. on Circuits Systems for Video Technology, 13(7):19 pages (2003).

* cited by examiner

US 12,489,945 B2

CLIENT-SIDE DECODING AND PLAYOUT AT CHANNEL CHANGES

FIELD OF THE INVENTION

The present disclosure relates to media content delivery. More particularly, the present disclosure relates to generation of a smooth, engaging transition from one media source to another or from one portion of a media source to another portion of the media source.

SUMMARY

One of the major contributors to increased channel change time is a delay due to buffering a newly acquired media stream before the stream is decoded and pictures are presented. An initial video buffering delay is common in some approaches, especially with advanced video compression standards in which flexible picture structures are used for coding efficiency in service production. Some approaches to channel or source changing or "zapping" result in display of a blank screen and delay of about 2-3 seconds (about 2000 ms to 3000 ms) or more. The delay with such approaches includes about 100 ms for multicast join, about 50 ms for program clock reference (PCR) retrieval, about 250 ms for program-specific information (PSI) retrieval, about 250 ms for conditional access, about 250 ms for random access point (RAP) acquisition, and about 1500 ms for initial video buffering. There may be other delay factors, e.g., application and operating system delays, error correction, and remote controller receiver delay, which are either negligible or highly dependent on a platform or network. In another approach, delay because of receipt of unusable predictive frames is decreased by providing a usable key frame to a client device. However, these delays persist, remain problematic, and reduce user enjoyment. Thus, a need has arisen for improvement of a transition during the delay.

Improved user interfaces for a media source change (e.g., broadcast channel change) and transitions are provided. The improved transitions improve the media delivery user interface. Video and audio decoding are managed independently, in some embodiments. Video decoding starts by identifying any independently decodable frame prior to an instantaneous decoding refresh (IDR). Pictures from the independently decodable frame are appropriately decoded and used to generate visual effects. As a result of the transition, perception of the delay is minimized at channel changes. That is, when a zap command is received, content is delivered immediately, in real time, or in near real time. The content delivers to the user an effect of responsiveness to the zap command. In some embodiments, instead of showing black frames, which is common in the art, until full streaming can resume, a first available decodable frame is utilized (more than once in some examples) to display relevant content to the user before a sequence of decoded frames is available for display.

The transition includes in some embodiments at least one of a substantially shorter period of display of a blank screen, insertion of an effect, use of content from a first source viewed prior to the change request, use of a first decodable frame from a second source while the second source is decoded for viewing, a repetition of display of available content, use of stored ready-to-display content, combinations of the same, or the like. The effect includes at least one of fade-out, fade-in, superimposition, dissolving, a change in frame rate, combinations of the same, or the like. After decoding of the second source is complete, a normal play state starts or resumes.

Associated costs are reduced, because, in some embodiments, the improved process occurs at a client side. The improved process is implemented, for example, in software updates for a set-top box (STB) or a local processor.

The present invention is not limited to the combination of the elements as listed herein and may be assembled in any combination of the elements as described herein.

These and other capabilities of the disclosed subject matter will be more fully understood after a review of the following figures, detailed description, and claims.

BRIEF DESCRIPTIONS OF THE DRAWINGS

The present disclosure, in accordance with one or more various embodiments, is described in detail with reference to the following figures. The drawings are provided for purposes of illustration only and merely depict non-limiting examples and embodiments. These drawings are provided to facilitate an understanding of the concepts disclosed herein and should not be considered limiting of the breadth, scope, or applicability of these concepts. It should be noted that for clarity and ease of illustration these drawings are not necessarily made to scale.

The embodiments herein may be better understood by referring to the following description in conjunction with the accompanying drawings, in which like reference numerals indicate identical or functionally similar elements, of which:

The drawings are intended to depict only typical aspects of the subject matter disclosed herein, and therefore should not be considered as limiting the scope of the disclosure. Those skilled in the art will understand that the structures, systems, devices, and methods specifically described herein and illustrated in the accompanying drawings are non-limiting embodiments and that the scope of the present invention is defined solely by the claims.

DETAILED DESCRIPTION

Methods and systems for improved media content delivery are provided. The media content delivery includes improvements to software architecture, video compression standards, over-the-top (OTT), live OTT, video on demand (VOD), internet protocol television (IPTV), linear free ad-supported streaming TV (FAST), audiovisual synthesis, combinations of the same, and the like.

In recent decades, bi-directional interactive pull-based IPTV has enjoyed pervasive acceptance and development. IPTV offers numerous exhilarating television channels. Despite the increased implementation of IPTV systems worldwide, a channel switching operation of a TV system requires additional development. Subscribers of IPTV services desire an ability to explore live TV stations and video content of interest swiftly and seamlessly. Zapping delay during a channel change is a deterrent that causes a significant degradation of user enjoyment of IPTV systems.

Upgrades to existing service production and streaming infrastructures and development of new streaming protocols and video encoding practices have not overcome the zapping delay problem. The high efficiency streaming protocol (HESP) has been available since 2020, but the addition of companion streams imposes significant storage cost. More importantly, picture quality variation issues are concerning since the switch of streams does not guarantee drift-free decoding.

Many approaches such as channel prediction based on behavior analysis are flawed in resolving zapping delay. A server-based solution with extra unicast, for example, introduces increased complexity and bandwidth requirements in response to a request for channel change. Besides requiring extra bandwidth, pre-buffering relies on predictions, which often leads to indeterministic zapping behaviors. Because of the zapping delay, subscribers continue to encounter difficulty and a degraded experience in selecting desired channels to view.

Figure 1:
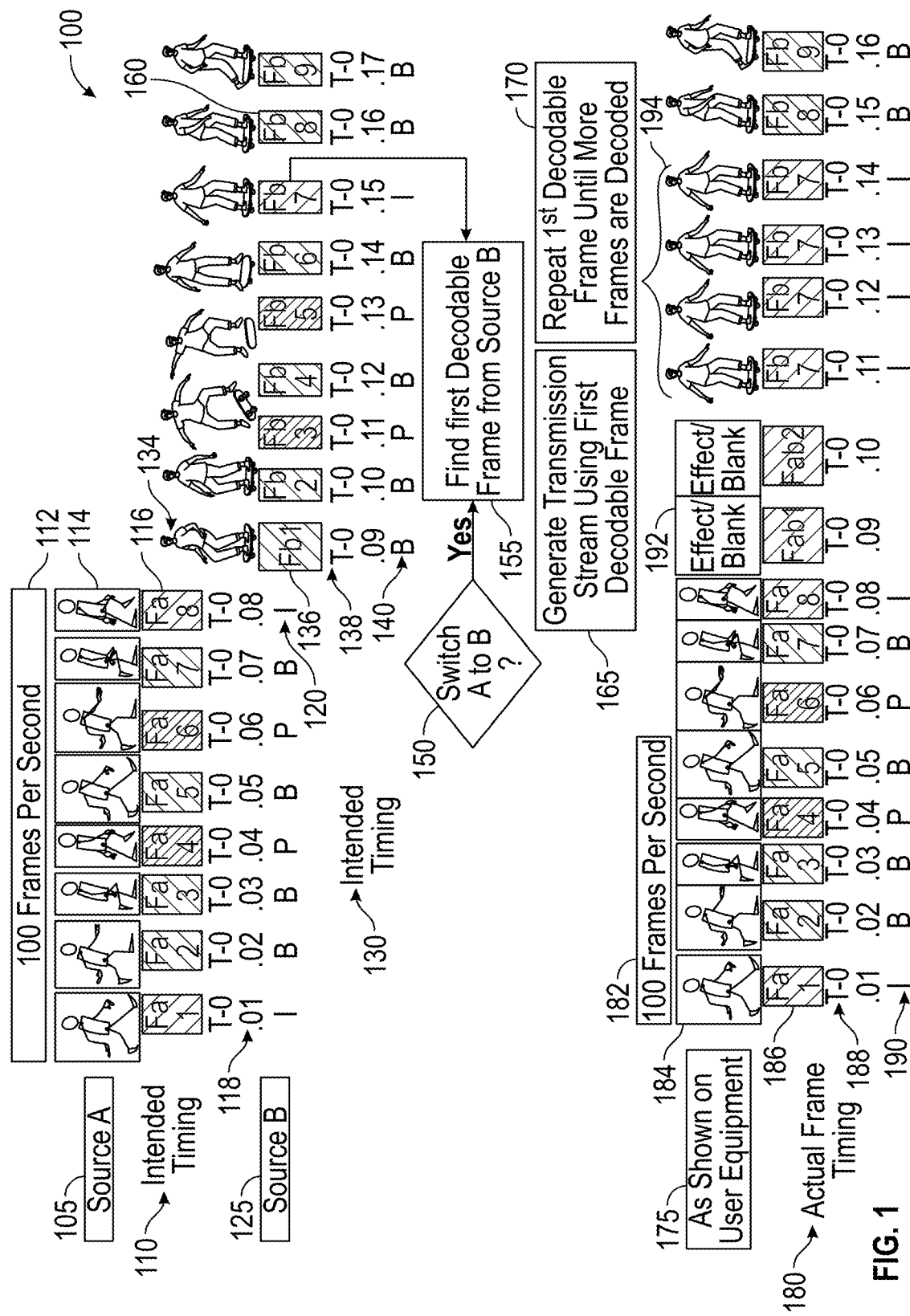
FIG. 1 depicts a transition from a first media source to a second media source including a partial process for generating content for the transition, in accordance with some embodiments of the disclosure.

FIGS. 1-4 depict examples of four different types of transitions between two sources in accordance with some embodiments. In FIG. 1, in a first scenario 100, a user desires to switch from Source A 105 to Source B 125. The Source A 105 and the Source B 125 are two different channels in some embodiments. In some embodiments, the Source A 105 and the Source B 125 are two different portions of a same content item (e.g., requesting a jump from one point of a streaming movie to another). In some embodiments, the Source A 105 and the Source B 125 are two different portions of a same multicast stream (e.g., zapping between channels in a multicast service like Twitch and the like). In some embodiments, the Source A 105 and the Source B 125 are two different streaming services (e.g., changing from one streaming service to another, like changes between Netflix, Disney+, Paramount+, Hulu, and the like).

In FIG. 1, the Source A 105 is depicted with an intended timing 110, a frame rate 112, and eight frames 114, where each of the frames 114 has a frame identifier 116, a frame timing 118, and a frame type 120. In this example, the frame rate 112 is 100 frames per second (fps). 100 fps is exemplary and is selected for ease of calculating fractions of a second. Any other suitable frame rate may be provided. The eight frames 114 depict a stick figure walking. The frame identifier 116 for each of the frames 114 is Fa1 to Fa8, respectively. The frame timing 118 for each of the frames 114 is provided in hundredths of a second from T-0.01 to T-0.08, respectively. The frame type 120 of the first frame Fa1 and the eighth frame Fa8 is an I-frame, also known as an intra-coded picture, I-picture, a key-frame, an intra-frame, and the like. The frame type 120 of the fourth frame Fa4 and the sixth frame Fa6 is a P-frame, also known as a predicted picture and the like. The frame type 120 of the second frame Fa2, the third frame Fa3, the fifth frame Fa5, and the seventh frame Fa7 is a B-frame, also known as a bi-directional predicted picture and the like.

Similarly, the Source B 125 is depicted with an intended timing 130 and nine frames 134, where each of the frames 134 has a frame identifier 136, a frame timing 138, and a frame type 140. The frame rate for the Source B 125 is also 100 fps. The nine frames 134 depict a boy skateboarding. The frame identifier 136 for each of the frames 134 is Fb1 to Fb9, respectively. The frame timing 138 for each of the frames 134 is provided in hundredths of a second from T-0.09 to T-0.17, respectively. The frame type 140 of the seventh frame Fb7 is an I-frame. The frame type 140 of the first frame Fb1, the second frame Fb2, the fourth frame Fb4, the sixth frame Fb6, the eighth frame Fb8, and the ninth frame Fb9 is a B-frame. The frame type 140 of the third frame Fb3 and the fifth frame Fb5 is a P-frame.

Thus far, FIG. 1 is described with reference to the Source A 105 and the Source B 125 as independent streams. A smooth transition as displayed on user equipment 175, which includes portions of the Source A 105 and/or the Source B 125, is provided. Similarly, the display on user equipment 175 is depicted with an actual frame timing 180 and sixteen frames 184, where each of the frames 184 has a frame identifier 186, a frame timing 188, and a frame type 190. The frame rate for the display on user equipment 175 is also 100 fps. The sixteen frames 184 depict a transition from the stick figure walking from the Source A 105 to the boy skateboarding From the Source B 125. The frame identifier 186 for each of the frames 184 is Fa1 to Fa8, Fab1, Fab2, Fb7 (repeated four times), Fb8, and Fb9, respectively. The frame timing 188 for each of the frames 184 is provided in hundredths of a second from T-0.01 to T-0.16, respectively. The frame type 190 follows the format provided and described herein for the Source A 105 and the Source B 125.

A process for generating the smooth transition is provided. The process includes a determination 150 of whether a request to switch from the Source A 105 to the Source B 125 is received. In response to receiving the request (150="Yes"), the process includes finding 155 a first decodable frame from the Source B 125, in some embodiments. In this example, the first decodable frame from the Source B 125 is the frame Fb7, which is an I-frame. At this point, the frame Fb7 is an identified first decodable frame 160. The process continues with generating 165 a transmission stream using the identified first decodable frame 160. Then, in this embodiment, the identified first decodable frame 160 (the frame Fb7) is repeated 170 until more frames are decoded.

As shown in FIG. 1, the transmission stream includes the eight frames from the Source A 105, two effect or blank frames 192 at times T-0.09 and T-0.10, respectively, four repeated frames 194 from the Source B 125 at times T-0.11 to T-0.14, respectively, and then continues with two subsequent frames from the Source B 125 at times T-0.15 and T-0.16, respectively. In some embodiments, the effect or blank frames 192 are provided for as short a time as possible and an effect or transitional content is provided as soon as possible. For example, the effect or the blank frames 192 are provided for about two one-hundredths of a second or about 20 ms. Beginning at the time T-0.15, a normal play state of the Source B 125 occurs. The transition as depicted extends from the time T-0.09 to the time T-0.14, i.e., about six one-hundredths of a second or about 60 ms. The duration of the transition is extended or shortened as necessary until a full decode of the Source B 125 is achieved and a normal play state is available. Although this example includes the two effect or blank frames 192 and the four repeated frames 194 from the Source B 125 before continuing with content from the Source B 125, it is understood that any suitable transition is provided in the transmission stream in some embodiments. The examples of FIGS. 1-4 are exemplary, not limiting.

Figure 2:
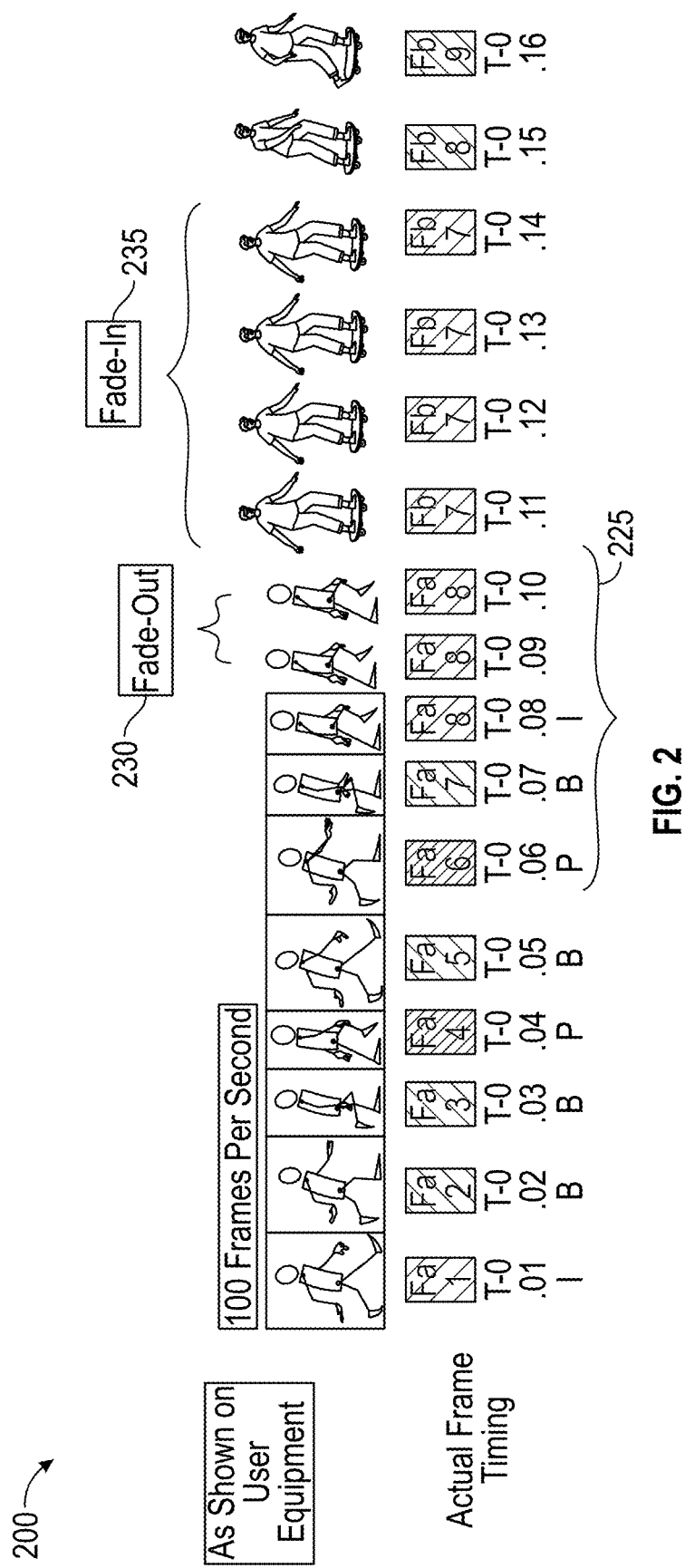
FIG. 2 depicts a fade-out transition from a first media source to a second media source, in accordance with some embodiments of the disclosure.
Figure 3:
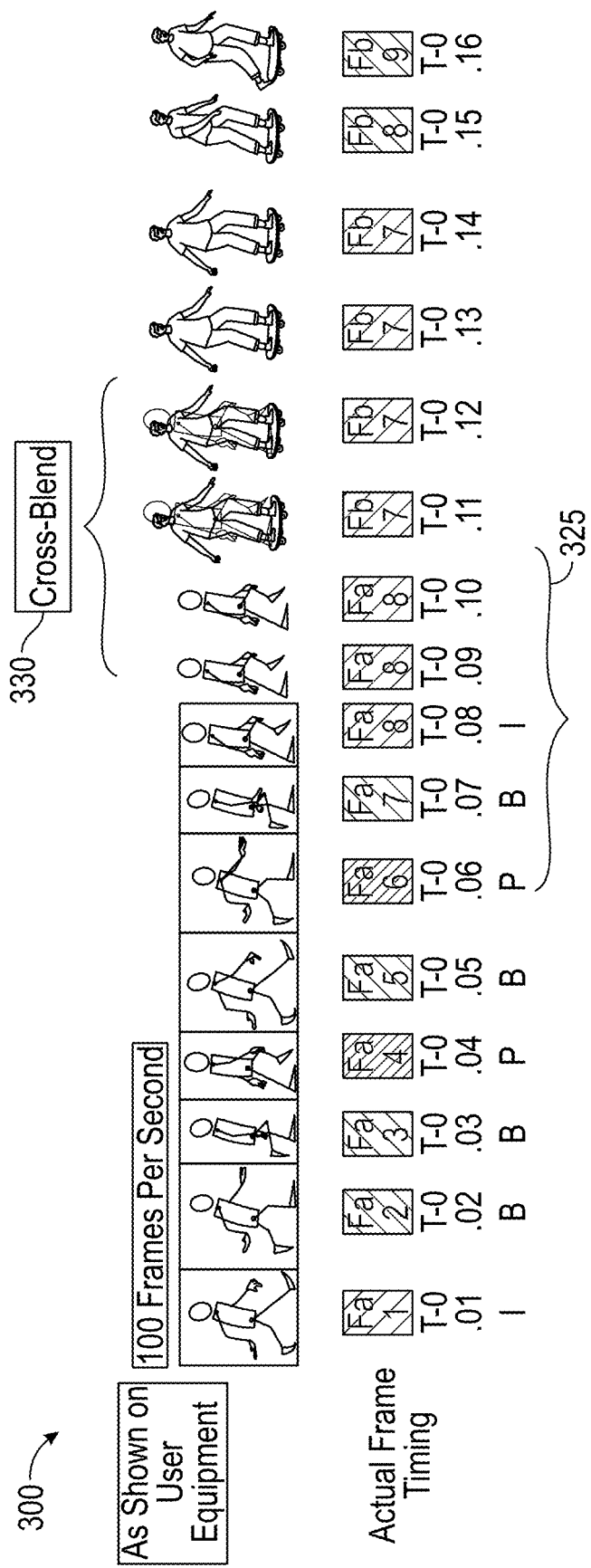
FIG. 3 depicts a cross-blend transition from a first media source to a second media source, in accordance with some embodiments of the disclosure.
Figure 4:
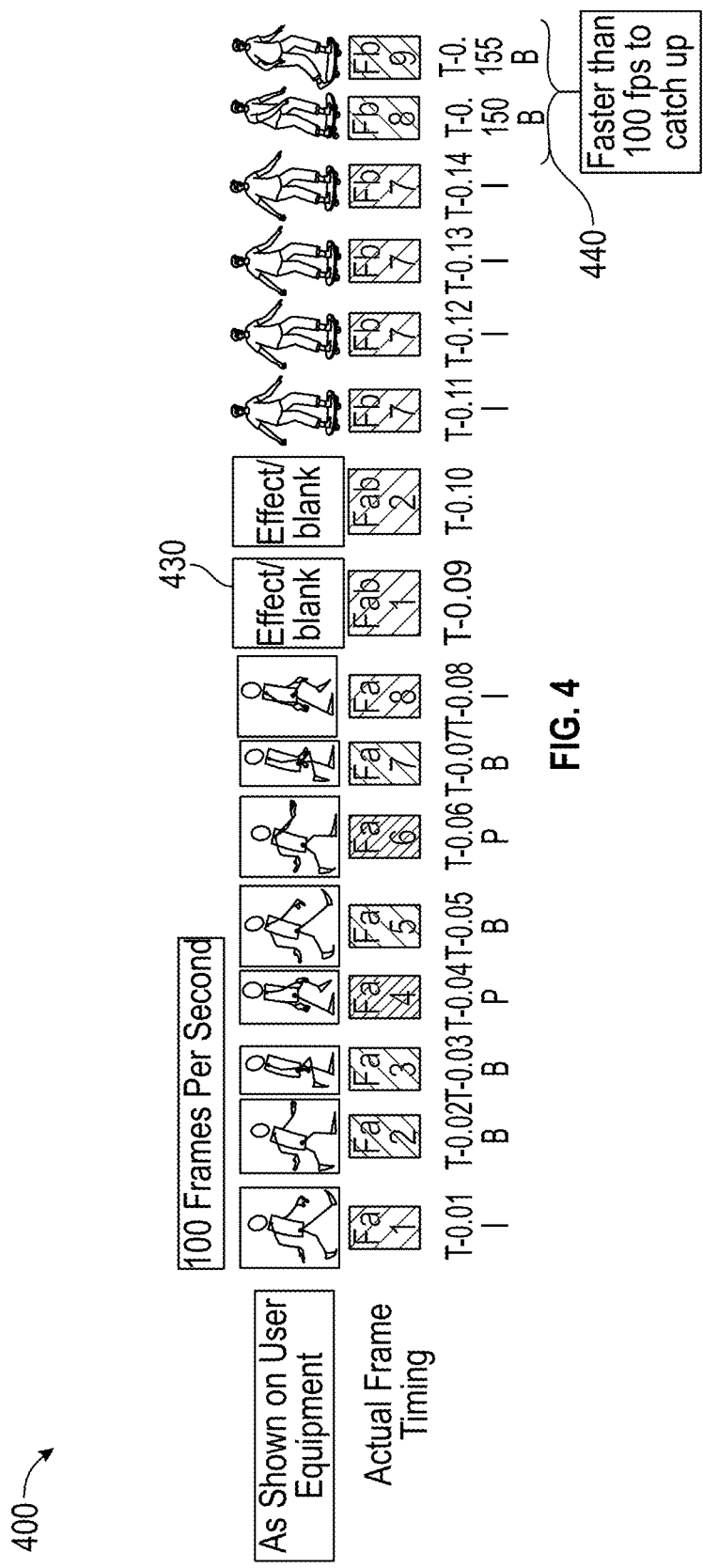
FIG. 4 depicts a transition from a first media source to a second media source with a catch-up period, in accordance with some embodiments of the disclosure.

FIGS. 2-4 depict examples of the transmission stream with different transitions from that shown in FIG. 1. In FIGS. 2-4, like features are depicted with or without like references and some descriptions are omitted for brevity. The format provided and described herein for FIG. 1 is continued in FIGS. 2-4.

As shown in FIG. 2, in a second scenario 200, the transmission stream includes the eight frames from the Source A 105, a fade-out effect 230 of the eighth frame Fa8 at times T-0.09 and T-0.10, a fade-in effect 235 based on four repetitions of the seventh frame Fb7 of the Source B 125 at times T-0.11 to T-0.14, respectively, and then continues with two frames from the Source B 125 at times T-0.15 and T-0.16, respectively. Beginning at the time T-0.15, a normal play state of the Source B 125 occurs. The transition as depicted extends from the time T-0.09 to the time T-0.14, i.e., about six one-hundredths of a second or about 60 ms. The duration and transition effects are variable as needed to sufficiently decode the Source B 125 to achieve the normal play state. In some embodiments, a group 225 of frames from the Source A 105 forms the basis of the transition. The transition at the times T-0.09 and T-0.10 is based on the frames Fa6, Fa7, and Fa8.

As shown in FIG. 3, in a third scenario 300, the transmission stream includes the eight frames from the Source A 105, a cross-blend effect 330, and then continues with two frames from the Source B 125 at times T-0.15 and T-0.16, respectively. The cross-blend effect 330 includes a repetition of the frame Fa8 from the Source A 105 at the times T-0.09 and T-0.10, respectively, a superimposition and blending of the frame Fa8 from the Source A 105 with the frame Fb7 from the Source B 125 at the times T-0.11 and T-0.12, respectively, and a repetition of the frame Fb7 from the Source B 125 at the times T-0.13 and T-0.14, respectively. Beginning at the time T-0.15, a normal play state of the Source B 125 occurs. The transition as depicted extends from the time T-0.09 to the time T-0.14, i.e., about six one-hundredths of a second or about 60 ms. The duration and transition effects are variable as needed to sufficiently decode the Source B 125 to achieve the normal play state. In some embodiments, a group 325 of frames from the Source A 105 forms the basis of the transition. The transition at the times T-0.09 and T-0.10 is an effect based on the frames Fa6, Fa7, and Fa8.

As shown in FIG. 4, in a fourth scenario 400, the transmission stream includes the eight frames from the Source A 105, two effect or blank frames 430 at times T-0.09 and T-0.10, respectively, four repetitions of the seventh frame Fb7 of the Source B 125 at times T-0.11 to T-0.14, respectively, and a catch-up effect 440 including two frames, Fb8 and Fb9, from the Source B 125 at times T-0.150 and T-0.155, respectively. That is, the catch-up effect 440 includes a play state at double normal speed, i.e., at 200 fps, in this example. Beginning at the time T-0.16, a normal play state of the Source B 125 occurs. The transition as depicted extends from the time T-0.09 to the time T-0.155, i.e., about seven and a half one-hundredths of a second or about 75 ms. The duration and transition effects are variable as needed to sufficiently decode the Source B 125 to achieve the normal play state.

Figure 5:
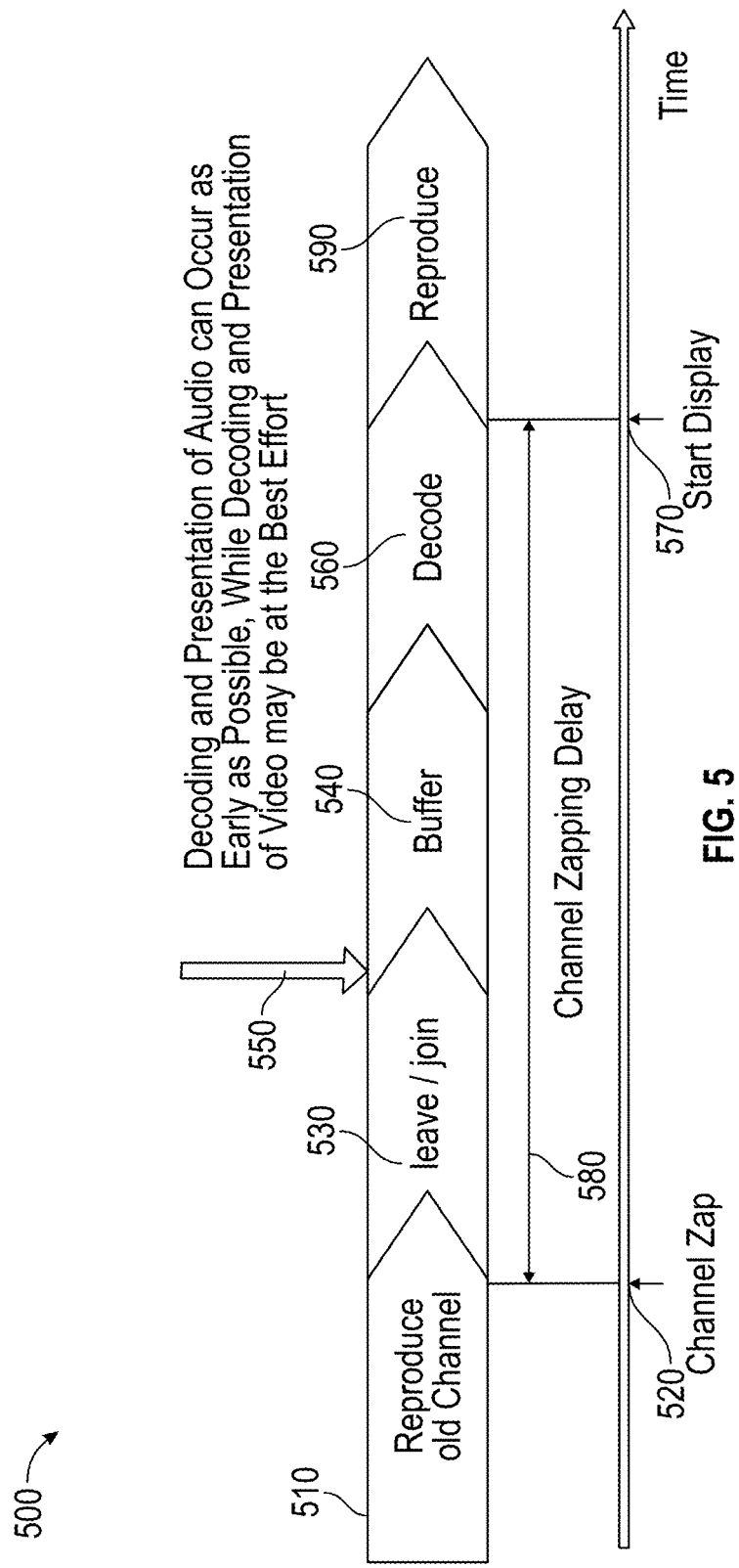
FIG. 5 depicts a transition from a first media source to a second media source with audio as early as possible and video at best effort, in accordance with some embodiments of the disclosure.

FIG. 5 depicts a process 500 that takes place during a content, channel, and/or source change. FIG. 5 is a simplified composition of multiple operations that together contribute to end-to-end zapping delay. The process 500 includes reproduction 510 of an old channel (e.g., the Source A 105), a leave/join delay 530, buffering 540, decoding 560, and reproduction 590 of a new channel (e.g., the Source B 125). A channel zap 520 starts the leave/join delay 530 and ends upon completion of the decoding 560 at a start 570 of display of the new channel. Channel zapping delay 580 extends from the channel zap 520 to the start 570 of the display of the new channel. The leave/join delay 530 is about several tens of ms, the buffering 540 delay is from about several hundred milliseconds to about a few seconds, and the decoding delay 560 is from about several hundred milliseconds to about a few seconds.

Instead of the approach of presenting a blank screen for an undesirable amount of time during a channel zapping delay, an improved process 550 including decoding and presentation of audio occurs as early as possible, while decoding and presentation of video is performed at best effort. The improved process 550 occurs between the leave/join delay 530 and the buffering 540, in some embodiments.

As noted above, channel delay results from multicast join, PCR retrieval, PSI retrieval, conditional access, RAP acquisition, and initial video buffering, as well as the aforementioned application and operating system delays, error correction, and remote controller receiver delay. Of these, the initial video buffering delay is significant with these approaches. The initial video buffering delay is improved substantially, i.e., shortened in duration. In some embodiments, PCR retrieval, PSI retrieval, conditional access, and initial video buffering is performed in parallel with the initial video buffering. In some embodiments, a reduction in delay during a channel change in IPTV is achieved by displaying a smooth transition. The smooth transition is provided to permit completion of time-consuming functions such as the initial video buffering, the RAP acquisition, and the multicast join functions.

A client-based solution for fast channel change is provided in some embodiments. The client-based solution applies an asynchronized play state of audio and video. The video buffering usually takes longer than audio buffering. In some embodiments, video presentation is slowed until decoded video data catches up to audio data. After video catches up with audio, video generation and display resume at a normal speed. As detailed herein, in some embodiments, a first decodable reference picture, e.g., an IDR, is decoded.

For a smooth play experience, video requires a certain amount of buffering before a play state. Segment-based video encoding provides an initial buffering of about 2 seconds or more. On the other hand, audio is decoded without delay after a relatively minimal amount of initial buffering, which is typically less than about 100 ms. In order to transmit synchronized audio and video packets and to ensure audio-video synchronization (e.g., lip-synchronization), both audio and video are buffered by a same amount at a receiver. In order to eliminate unnecessary buffering for audio, the audio is delayed with respect to video on a transmitter side, in some embodiments. That is, audio is delayed about 1.9 seconds with respect to the video when multiplexed into a transmission stream, in some embodiments.

The decoding and playout are configured so that independently decodable fragments, e.g., a video frame, an audio sample, and the like, is presented as soon as possible, as illustrated in FIG. 5. Until complete synchronization of audio and video occurs, the audiovisual effect is managed to provide a graceful transition. In some embodiments, the decoding and presentation of audio and video data occurs during the buffering 540.

In some embodiments, audio starts playing while a video decoder is waiting to buffer video segments. As soon as the audio frames are decoded, an audio play state is initiated with a received presentation time stamp (PTS).

The video decoding and presentation is performed in a manner of best effort in some embodiments. Segments of a video bitstream prior to a next IDR are parsed and decoded whenever possible. An intra picture or clean random access (CRA) picture is independently decoded. Once the intra picture or the CRA picture is ready, the intra picture or the CRA picture is provided for immediate presentation in some embodiments. Management of a video display buffer differs from operations that follow a synchronized start of audiovisual presentation, e.g., from an IDR.

Intra or CRA pictures are commonly used in video encoding. When a scene change is detected, an intra picture is inserted. The intra picture is part of a closed or open group of pictures (GOP). A choice between the closed GOP or the open GOP is dependent or independent of segment boundaries, which are configured in video encoding production. Insertion of the intra picture as a transition during zapping delay is provided.

The benefits of assigning or inserting the intra picture are multifold. Intra picture insertion eliminates drifting observed in, e.g., MPEG-2, where floating-point computation occurs. Intra picture insertion reduces encoding complexity since encoding an inter picture at a scene change leads to ineffectual motion estimation and prediction. Moreover, intra picture insertion avoids, and promotes recovery from, continuous quality degradation over time since inter predictive coding inherently degrades efficiency when reference pictures become lower quality.

Figure 6:
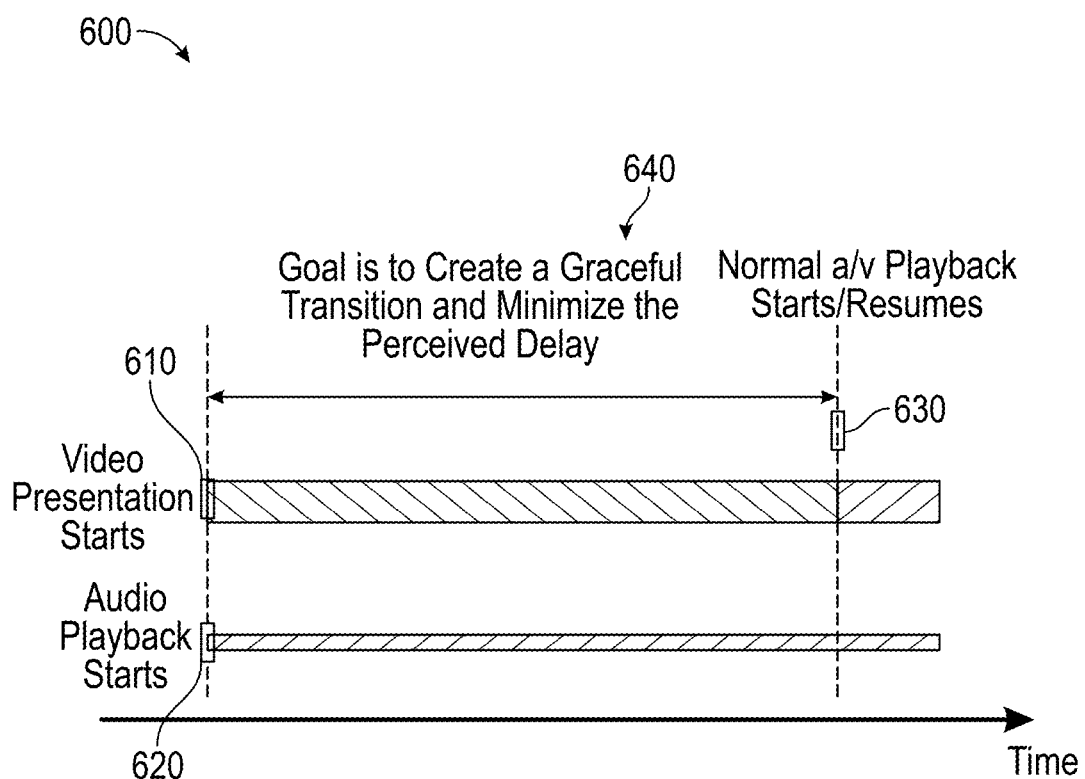
FIG. 6 depicts a general transition from a first media source to a second media source, in accordance with some embodiments of the disclosure.

FIG. 6 is a chart 600 of a delay of a video presentation until decoding of a video bitstream is completed. That is, at a channel change, video is decoded later than audio. A transition is provided during the delay. The chart 600 shows an early or transitional start 610 of enhanced video presentation, a start 620 of an audio play state, and a normal start or resumption 630 of an audiovisual play state. That is, between the early start 610 and the normal start 630, at least one transition 640 is provided. Various examples of the transition 640 are provided. In some embodiments, the transition 640 includes different visual effects and/or a process for obtaining available and useful video data during the channel change. One goal of the transition 640 is to minimize a duration of a blank or black screen and instead present curated pictures and/or video that leads to a graceful transition of an audiovisual experience.

In some embodiments, in order to minimize or eliminate presentation of a blank or black screen, or the like, a pre-downloaded informational image or clip is provided. The pre-downloaded informational image or clip relates to a change of a requested content, channel, or source in some embodiments. For example, a cover image or clip serving as an introduction of content playing on each channel is obtained before a change request is initiated. In some embodiments, channel prediction is provided when there is an excessive amount of content (e.g., too many cover images) to download. The cover image or clip provides the user information on the content so that the transition will be a different but seamless and informative experience. The user is presented with information allowing the user to have a much better idea of what is showing on the channel. Thus, the user has additional information leading to a faster decision on whether to watch content or switch away. Any suitable content is provided to fill in the delay. The content includes advertisements, thumbnails, and the like.

When there is no video data appropriately decoded and available for presentation from the desired source, the screen may remain black, as shown, for example, in the examples of FIGS. 1 and 4. In some embodiments, a last picture of the previous channel is utilized and a fade-out effect is applied, as shown, for example, in FIG. 2. In some embodiments, the duration of the fade-out effect depends on a time when the first available picture from the new channel becomes available. In some embodiments, remaining video segment from the previous channel is utilized until there are no more decodable pictures from the previous channel, and/or until a normal play state of the new channel is achieved.

In some embodiments, a catch-up period is not necessary. For example, the catch-up period is not necessary when an expected video is not intentionally slowed down and/or delayed. Pictures or video presented prior to the next IDR are not intended to synchronize with audio. When an IDR arrives, a normal play state is resumed. In the case of a curated slowdown, a faster-than-normal play state is utilized to catch up, as shown, for example, in FIG. 4. In some embodiments, frames are skipped in order to catch up.

In some embodiments, upon availability of the first decodable picture of the new channel, an effect such as fade-in is applied, as shown, for example, in FIG. 2. In some embodiments, the fade-out and fade-in effects are combined to achieve an overall effect of crossfading, cross-blending, dissolving, or the like, of pictures and video, as shown, for example, in FIG. 3. The duration of such fading choices is calculated in anticipation of presenting the first decodable picture from the new channel in some embodiments. Superimposition is applied to creating a transition of pictures or video in some embodiments. For example, a fade-in transition from a black screen to a white screen or from a black screen to new content from the new channel is provided. Also, for example, a fade-out transition from old content from the old channel to a black screen or to a white screen is provided. Other suitable transitions of the like (e.g., white-to-black) are provided in some embodiments. Choices of fading, dissolving, superimposition, and the like are adaptively and dynamically alternated at channel changes to ensure that the effects do not create fatigue.

Decoding and presenting of any decodable picture or pictures are provided. The first decodable picture of the new channel does not necessarily have to be an IDR. As described herein, any I-picture existing in the segment prior to an IDR is decoded, in some embodiments. Once available, such decodable pictures are used for presentation in the transition.

Figure 7:
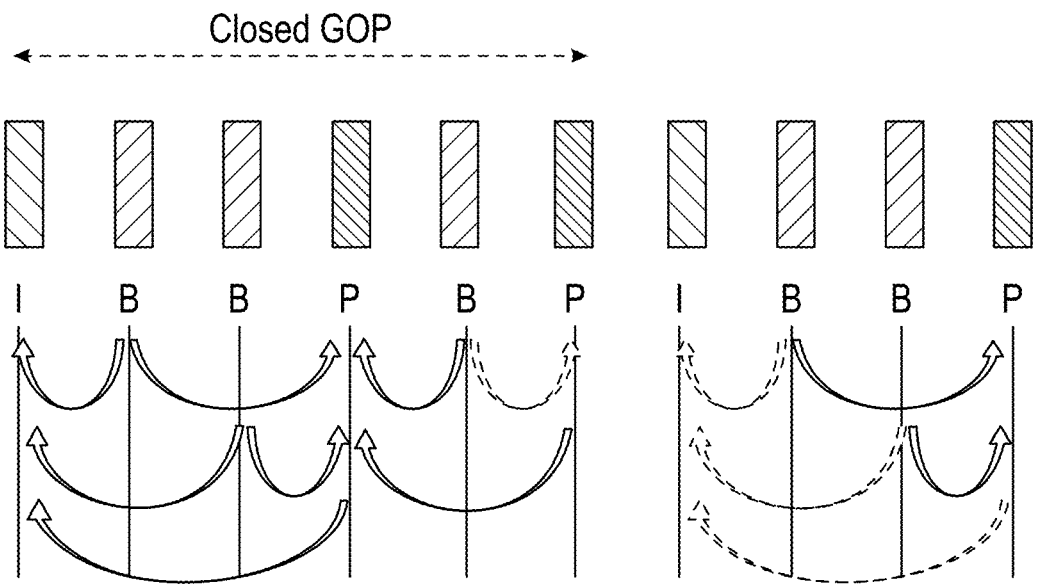
FIG. 7 depicts a closed group of pictures (GOP), in accordance with some embodiments of the disclosure.
Figure 8:
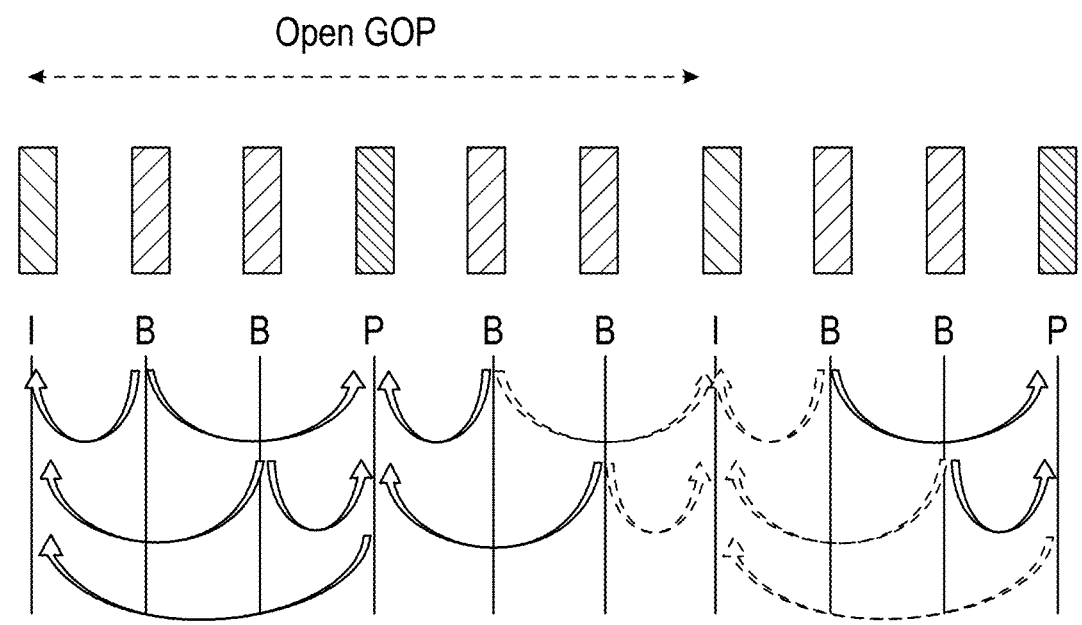
FIG. 8 depicts an open GOP, in accordance with some embodiments of the disclosure.

FIGS. 7 and 8 depict examples of a closed GOP and an open GOP. In FIG. 7, the first GOP concludes with a Predictive-frame (P-frame) rather than a Bi-directional frame (B-frame), which enables the encoder to prevent frames from the subsequent GOP from being utilized as predictors. That is, one difference between closed and open GOPs regards inter-prediction referencing structures across the second I-picture. The pictures are presented in display order. Each I-picture is a CRA picture that is independently decodable.

In FIG. 8, the open GOP permits frames within it to reference frames from a different GOP. For instance, in FIG. 8, the second I-frame is used as a predictor by B-frames from the preceding GOP, indicating that this is an open GOP. When the decoding starts from the second I-picture in the example of open GOP, the CRA picture itself and all the pictures that follow it in display order are correctly decoded. However, there may be some pictures that follow the CRA picture in decoding order and precede it in display order that are not properly decoded. This is because there is inter-picture prediction from pictures that precede the CRA picture in decoding order. When not decoded appropriately, the pictures that are not properly decoded are discarded in the case of performing a random access.

Figure 9:
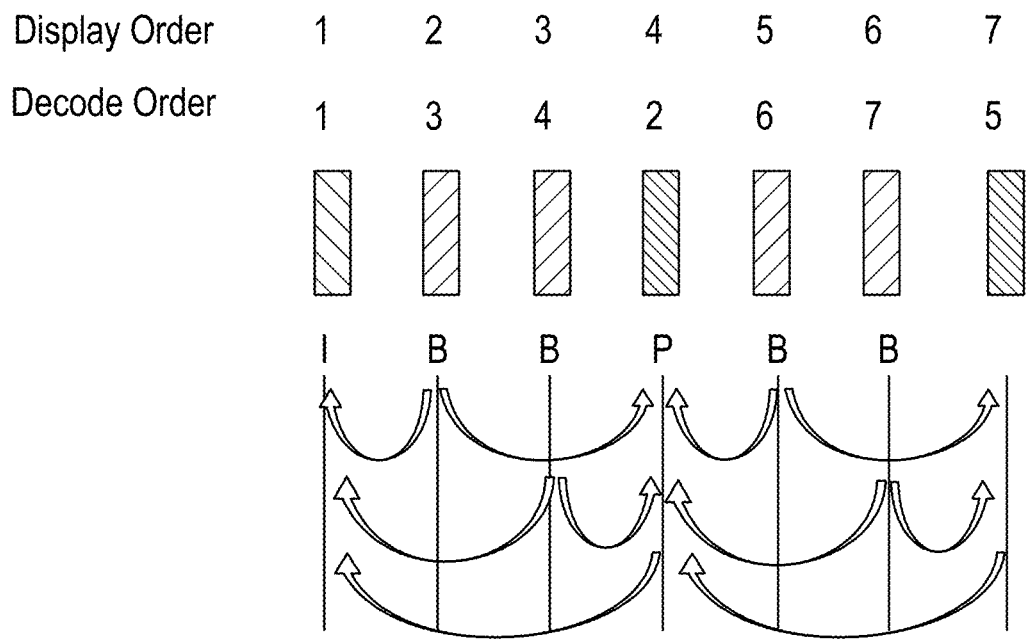
FIG. 9 depicts display order and decode order for a closed GOP, in accordance with some embodiments of the disclosure.

FIG. 9 illustrates a difference between the decoding and display orders. In the example of open GOP shown in FIG. 8, the two B-pictures preceding the second I-picture in display order are decoded after the decoding of that I-picture. However, in a random access starting from that I-picture, the decoding of those B-pictures is not guaranteed due to a missing P-picture that precedes those I and B pictures. Any decodable pictures, e.g., P or B-pictures following the CRA or I-picture in the case of an open GOP, are utilized in creating the transitional video.

The example in FIG. 9 also depicts an inherent delay between the start of decoding and the start of display in a normal video play state. The I-picture cannot be displayed immediately after its decoding because the next picture in the display order, i.e., the second B-picture, is not available for display at the end of displaying the I-picture. Therefore, in this example, the start of displaying the I-picture is delayed by the duration of two pictures. Once started, display is continuous.

In some embodiments, to achieve the transition at the channel or source change, the latency described above is reduced by an early start of displaying the I-picture, as shown, for example, in FIGS. 1-4. Essentially, the decoded I-picture is utilized as soon as possible. Either an IDR or a CRA picture is provided as part of the available pictures for presentation at the transition.

Figure 10:
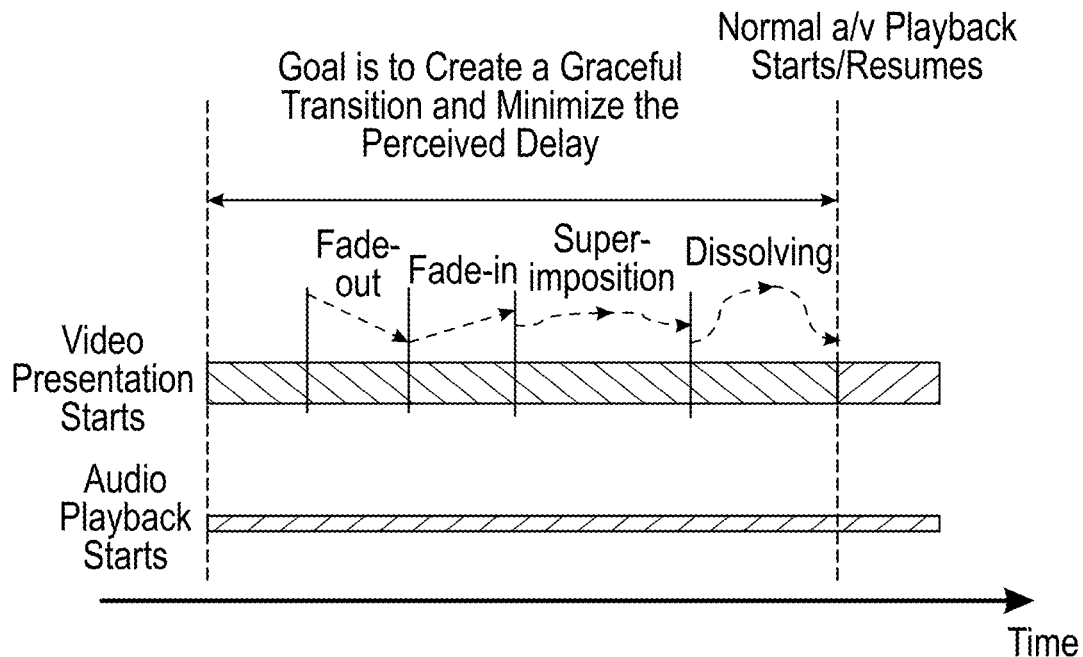
FIG. 10 depicts a series of fade-out, fade-in, superimposition, and dissolving transitions from a first media source to a second media source, in accordance with some embodiments of the disclosure.

FIG. 10 depicts cascaded effects of fade-out, fade-in, superimposition, dissolving, and the like when multiple pictures are available, for example, in a buffer, for the transition. When multiple pictures are decoded and become available, different choices are applied to the playout of video. In some embodiments, generative artificial intelligence (AI) is utilized to create appropriate visual effects and transitions. The generative AI utilizes any available visual data as source material. The temporal transition among the pictures is created without breaking audiovisual coherency and naturalness.

As shown in FIG. 10, the processing is initiated to curate a graceful transition. In some embodiments, when the anticipated delay does not exceed a threshold (e.g., about 200 ms), the generation of the transition is not performed to avoid an unnecessary increase in complexity. For example, when an IDR picture is momentarily received at a channel change, the generation of the transition is not performed.

Figure 11:
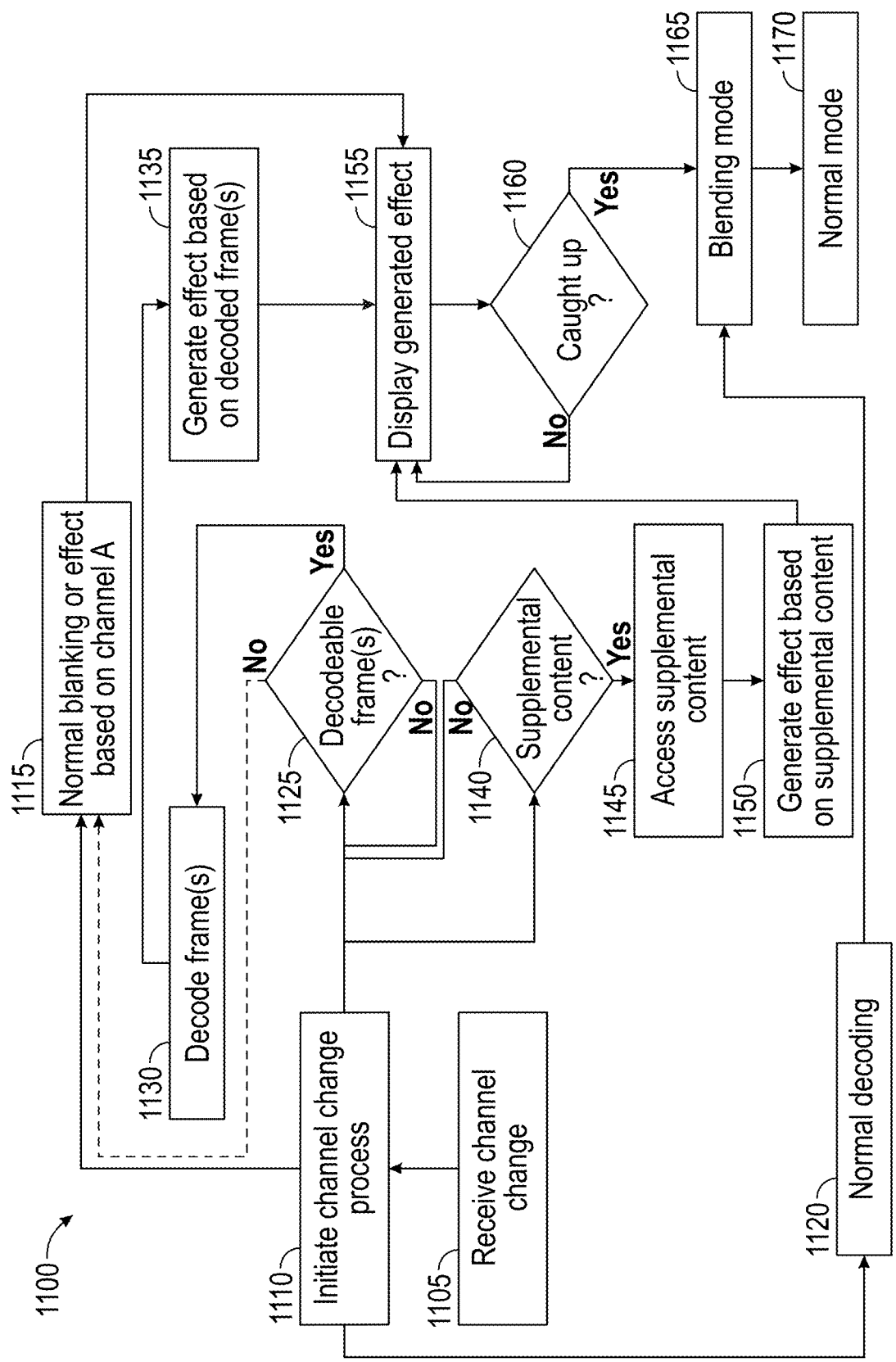
FIG. 11 depicts a process for generating a transition from a first media source to a second media source, in accordance with some embodiments of the disclosure.

FIG. 11 depicts a process 1100 for generating a transition from a first media source to a second media source, in accordance with some embodiments. The process 1100 includes receiving 1105 a channel change and initiating 1110 a channel change process. In some embodiments, the process 1100 includes generating 1115 a normal blanking or effect based on Channel A (i.e., the previously viewed channel) immediately upon the initiating 1110 of the channel change process. In some embodiments, the process 1100 includes determining 1125 whether a decodable frame is available. In response to the determining 1125 that no decodable frame is available (1125="No"), the determining 1125 continues, and/or is followed by the generating 1115. In response to the determining 1125 that a decodable frame is available (1125="Yes"), the process 1100 includes decoding 1130 the decodable frame, generating 1135 an effect based on the decoded frame from the decoding 1130, and displaying 1155 the generated effect.

In some embodiments, in parallel with the determining 1125, the process 1100 includes determining 1140 whether supplemental content is available. In response to the determining 1140 that no supplemental content is available (1140="No"), the process 1100 proceeds to the determining 1125. In response to the determining 1125 that supplemental content is available (1140="Yes"), the process 1100 includes accessing 1145 the supplemental content, generating 1150 the effect based on the supplemental content from the accessing 1145, and the displaying 1155 of the generated effect.

In some embodiments, after the displaying 1155 of the generated effect, the process 1100 includes determining 1160 whether a transitional play state is caught up with Channel B in a normal mode 1170, i.e., the new content or channel. In response to the determining 1160 that the transitional play state is not caught up (1160="No"), the process 1100 continues the displaying 1155 of the generated effect. In response to the determining 1160 that the transitional play state is caught up (1160="Yes"), the process 1100 includes a blending mode 1155 and the normal mode 1170.

In some embodiments, the process includes normal decoding 1120 of the new content or channel in parallel with at least one of the generating 1115, the determining 1125, or the determining 1140, including subsequent processes. In some embodiments, the normal decoding 1120 occurs until the determining 1160 indicates that the transitional play state is caught up (1160="Yes"). Although the blending mode 1165 is depicted after the determining 1160, in some embodiments, the blending mode 1165 is part of at least one of the generating 1135, the generating 1150, the displaying 1155, combinations of the same, or the like.

Each of the processes of FIGS. 1-6, 10, and 11 may be standalone or integrate into a larger process. Although separate processes are illustrated in FIGS. 1-6, 10, and 11, functionality of one or more processes may be combined, duplicated, or omitted in any suitable configuration. Where parallel processes are illustrated, the processes may be performed in series; where series processes are illustrated, the processes may be performed in parallel. Although some processes are shown as a single process, processes may be integrated into a single process on a single device or distributed in any suitable manner. The processes may be actively processed, and/or models may be pre-trained to include one or more processes disclosed herein.

Predictive Model

Figure 12:
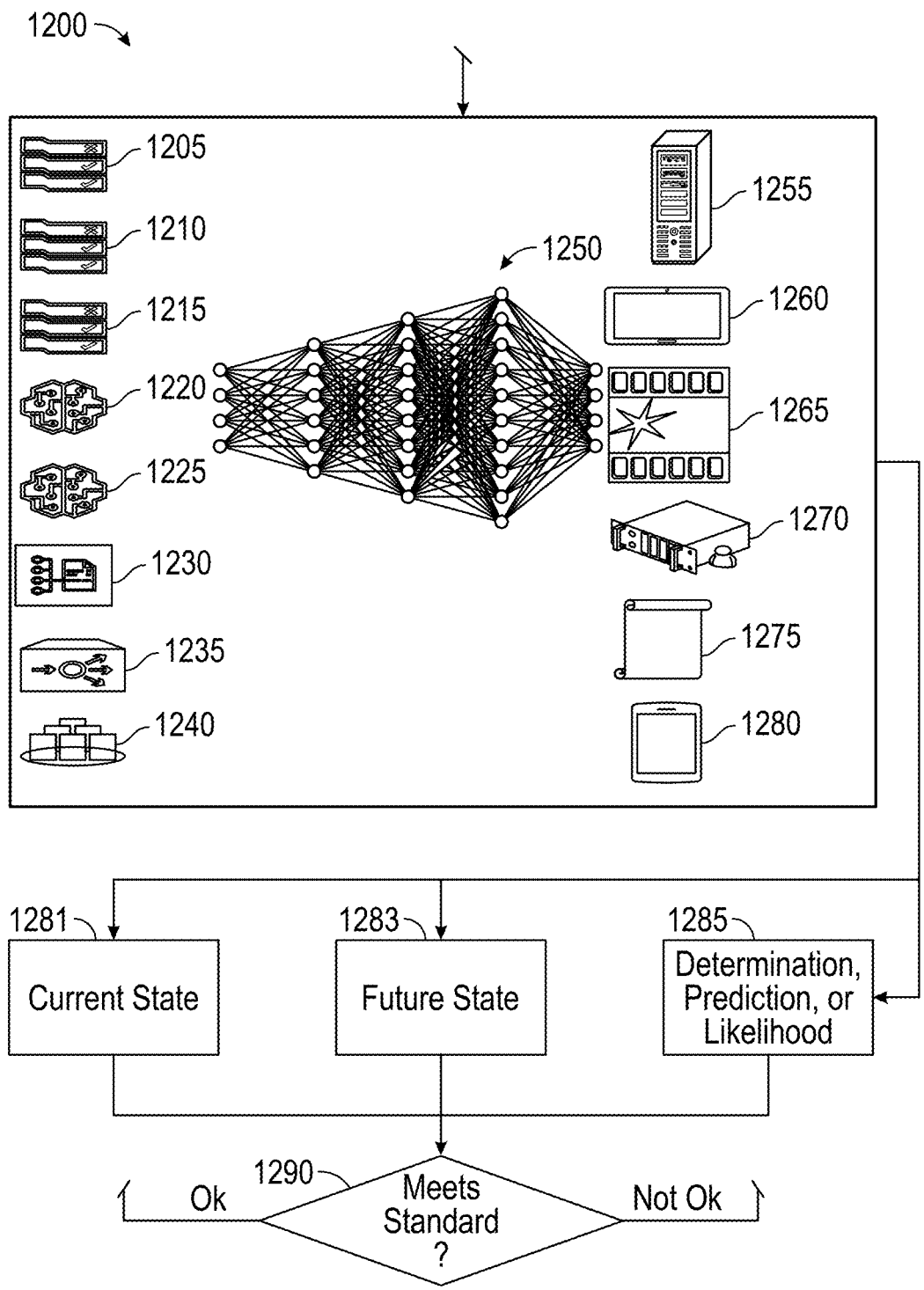
FIG. 12 depicts an artificial intelligence system for generating meme suggestions, in accordance with some embodiments of the disclosure.

Throughout the present disclosure, in some embodiments, determinations, predictions, likelihoods, and the like are determined with one or more predictive models. For example, FIG. 12 depicts a predictive model. A prediction process 1200 includes a predictive model 1250 in some embodiments. The predictive model 1250 receives as input various forms of data about one, more or all the users, media content items, devices, and data described in the present disclosure. The predictive model 1250 performs analysis based on at least one of hard rules, learning rules, hard models, learning models, usage data, load data, analytics of the same, metadata, or profile information, and the like. The predictive model 1250 outputs one or more predictions of a future state of any of the devices described in the present disclosure. A load-increasing event is determined by load-balancing processes, e.g., least connection, least bandwidth, round robin, server response time, weighted versions of the same, resource-based processes, and address hashing. The predictive model 1250 is based on input including at least one of a hard rule 1205, a user-defined rule 1210, a rule defined by a content provider 1215, a hard model 1220, or a learning model 1225.

The predictive model 1250 receives as input usage data 1230. The predictive model 1250 is based, in some embodiments, on at least one of a usage pattern of the user or media device, a usage pattern of the requesting media device, a usage pattern of the media content item, a usage pattern of the communication system or network, a usage pattern of the profile, or a usage pattern of the media device.

The predictive model 1250 receives as input load-balancing data 1235. The predictive model 1250 is based on at least one of load data of the display device, load data of the requesting media device, load data of the media content item, load data of the communication system or network, load data of the profile, or load data of the media device.

The predictive model 1250 receives as input metadata 1240. The predictive model 1250 is based on at least one of metadata of the streaming service, metadata of the requesting media device, metadata of the media content item, metadata of the communication system or network, metadata of the profile, or metadata of the media device. The metadata includes information of the type represented in the media device manifest.

The predictive model 1250 is trained with data. The training data is developed in some embodiments using one or more data processes including but not limited to data selection, data sourcing, and data synthesis. The predictive model 1250 is trained in some embodiments with one or more analytical processes including but not limited to classification and regression trees (CART), discrete choice models, linear regression models, logistic regression, logit versus probit, multinomial logistic regression, multivariate adaptive regression splines, probit regression, regression processes, survival or duration analysis, and time series models. The predictive model 1250 is trained in some embodiments with one or more machine learning approaches including but not limited to supervised learning, unsupervised learning, semi-supervised learning, reinforcement learning, and dimensionality reduction. The predictive model 1250 in some embodiments includes regression analysis including analysis of variance (ANOVA), linear regression, logistic regression, ridge regression, and/or time series. The predictive model 1250 in some embodiments includes classification analysis including decision trees and/or neural networks. In FIG. 12, a depiction of a multi-layer neural network is provided as a non-limiting example of a predictive model 1250, the neural network including an input layer (left side), three hidden layers (middle), and an output layer (right side) with 32 neurons and 192 edges, which is intended to be illustrative, not limiting. The predictive model 1250 is based on data engineering and/or modeling processes. The data engineering processes include exploration, cleaning, normalizing, feature engineering, and scaling. The modeling processes include model selection, training, evaluation, and tuning. The predictive model 1250 is operationalized using registration, deployment, monitoring, and/or retraining processes.

The predictive model 1240 is configured to output results to a device or multiple devices. The device includes means for performing one, more, or all the features referenced herein of the systems, methods, processes, and outputs of one or more of FIGS. 1-6, 10, and 11, in any suitable combination. The device is at least one of a server 1255, a tablet 1260, a media display device 1265, a network-connected computer 1270, a media device 1275, a computing device 1280, or the like.

The predictive model 1250 is configured to output a current state 1281, and/or a future state 1283, and/or a determination, a prediction, or a likelihood 1285, and the like. The current state 1281, and/or the future state 1283, and/or the determination, the prediction, or the likelihood 1285, and the like may be compared 1290 to a predetermined or determined standard. In some embodiments, the standard is satisfied (1490=OK) or rejected (1490=NOT OK). If the standard is satisfied or rejected, the predictive process 1200 outputs at least one of the current state, the future state, the determination, the prediction, or the likelihood to any device or module disclosed herein.

Communication System

Figure 13:
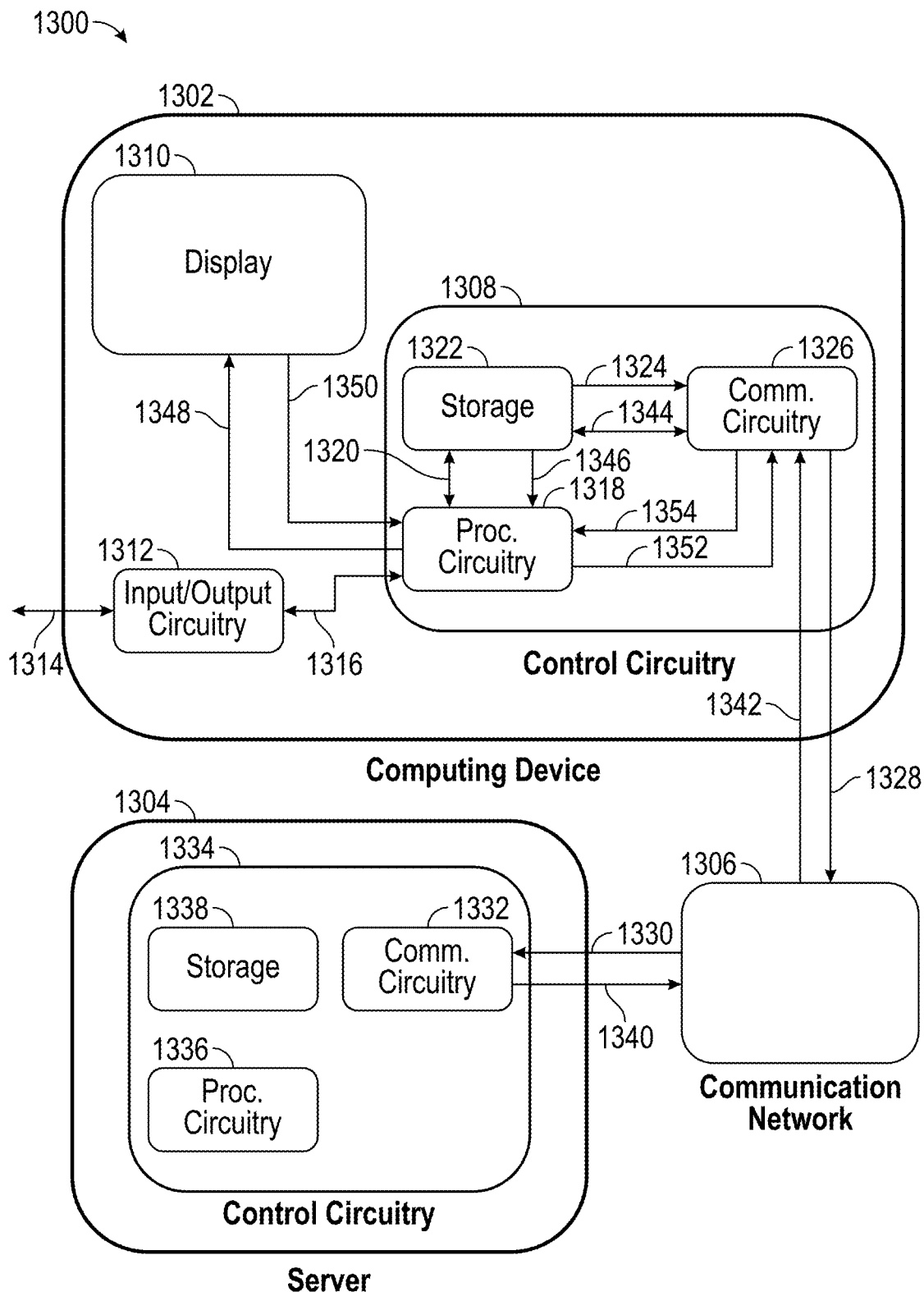
FIG. 13 depicts a system including a server, a communication network, and a computing device for performing the methods and processes noted herein, in accordance with some embodiments of the disclosure.

FIG. 13 depicts a block diagram of system 1300, in accordance with some embodiments. The system is shown to include computing device 1302, server 1304, and a communication network 1306. It is understood that while a single instance of a component may be shown and described relative to FIG. 13, additional embodiments of the component may be employed. For example, server 1304 may include, or may be incorporated in, more than one server. Similarly, communication network 1306 may include, or may be incorporated in, more than one communication network. Server 1304 is shown communicatively coupled to computing device 1302 through communication network 1306. While not shown in FIG. 13, server 1304 may be directly communicatively coupled to computing device 1302, for example, in a system absent or bypassing communication network 1306.

Communication network 1306 may include one or more network systems, such as, without limitation, the Internet, LAN, Wi-Fi, wireless, or other network systems suitable for audio processing applications. The system 1300 of FIG. 13 excludes server 1304, and functionality that would otherwise be implemented by server 1304 is instead implemented by other components of the system depicted by FIG. 13, such as one or more components of communication network 1306. In still other embodiments, server 1304 works in conjunction with one or more components of communication network 1306 to implement certain functionality described herein in a distributed or cooperative manner.

Similarly, the system depicted by FIG. 13 excludes computing device 1302, and functionality that would otherwise be implemented by computing device 1302 is instead implemented by other components of the system depicted by FIG. 13, such as one or more components of communication network 1306 or server 1304 or a combination of the same. In other embodiments, computing device 1302 works in conjunction with one or more components of communication network 1306 or server 1304 to implement certain functionality described herein in a distributed or cooperative manner.

Computing device 1302 includes control circuitry 1308, display 1310 and input/output (I/O) circuitry 1312. Control circuitry 1308 may be based on any suitable processing circuitry and includes control circuits and memory circuits, which may be disposed on a single integrated circuit or may be discrete components. As referred to herein, processing circuitry should be understood to mean circuitry based on at least one of microprocessors, microcontrollers, digital signal processors, programmable logic devices, field-programmable gate arrays (FPGAs), or application-specific integrated circuits (ASICs), combinations of the same, or the like, and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Some control circuits may be implemented in hardware, firmware, or software. Control circuitry 1308 in turn includes communication circuitry 1326, storage 1322 and processing circuitry 1318. Either of control circuitry 1308 and 1334 may be utilized to execute or perform any or all the systems, methods, processes, and outputs of one or more of FIGS. 1-6, 10, and 11, or any combination of steps thereof (e.g., as enabled by processing circuitries 1318 and 1336, respectively).

In addition to control circuitry 1308 and 1334, computing device 1302 and server 1304 may each include storage (storage 1322, and storage 1338, respectively). Each of storages 1322 and 1338 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 8D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 1322 and 1338 may be used to store several types of content, metadata, and/or other types of data. Non-volatile memory may also be used (e.g., to launch a boot-up routine and other instructions). Cloud-based storage may be used to supplement storages 1322 and 1338 or instead of storages 1322 and 1338. In some embodiments, a user profile and messages corresponding to a chain of communication may be stored in one or more of storages 1322 and 1338. Each of storages 1322 and 1338 may be utilized to store commands, for example, such that when each of processing circuitries 1318 and 1336, respectively, are prompted through control circuitries 1308 and 1334, respectively. Either of processing circuitries 1318 or 1336 may execute any of the systems, methods, processes, and outputs of one or more of FIGS. 1-6, 10, and 11, or any combination of steps thereof.

In some embodiments, control circuitry 1308 and/or 1334 executes instructions for an application stored in memory (e.g., storage 1322 and/or storage 1338). Specifically, control circuitry 1308 and/or 1334 may be instructed by the application to perform the functions discussed herein. In some embodiments, any action performed by control circuitry 1308 and/or 1334 may be based on instructions received from the application. For example, the application may be implemented as software or a set of and/or one or more executable instructions that may be stored in storage 1322 and/or 1338 and executed by control circuitry 1308 and/or 1334. The application may be a client/server application where only a client application resides on computing device 1302, and a server application resides on server 1304.

The application may be implemented using any suitable architecture. For example, it may be a stand-alone application wholly implemented on computing device 1302. In such an approach, instructions for the application are stored locally (e.g., in storage 1322), and data for use by the application is downloaded on a periodic basis (e.g., from an out-of-band feed, from an Internet resource, or using another suitable approach). Control circuitry 1308 may retrieve instructions for the application from storage 1322 and process the instructions to perform the functionality described herein. Based on the processed instructions, control circuitry 1308 may determine a type of action to perform in response to input received from I/O circuitry 1312 or from communication network 1306.

In client/server-based embodiments, control circuitry 1308 may include communication circuitry suitable for communicating with an application server (e.g., server 1304) or other networks or servers. The instructions for conducting the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 1306). In another example of a client/server-based application, control circuitry 1308 runs a web browser that interprets web pages provided by a remote server (e.g., server 1304). For example, the remote server may store the instructions for the application in a storage device.

The remote server may process the stored instructions using circuitry (e.g., control circuitry 1334) and/or generate displays. Computing device 1302 may receive the displays generated by the remote server and may display the content of the displays locally via display 1310. For example, display 1310 may be utilized to present a string of characters. This way, the processing of the instructions is performed remotely (e.g., by server 1304) while the resulting displays, such as the display windows described elsewhere herein, are provided locally on computing device 1304. Computing device 1302 may receive inputs from the user via input/output circuitry 1312 and transmit those inputs to the remote server for processing and generating the corresponding displays.

Alternatively, computing device 1302 may receive inputs from the user via input/output circuitry 1312 and process and display the received inputs locally, by control circuitry 1308 and display 1310, respectively. For example, input/output circuitry 1312 may correspond to a keyboard and/or a set of and/or one or more speakers/microphones which are used to receive user inputs (e.g., input as displayed in a search bar or a display of FIG. 13 on a computing device). Input/output circuitry 1312 may also correspond to a communication link between display 1310 and control circuitry 1308 such that display 1310 updates in response to inputs received via input/output circuitry 1312 (e.g., simultaneously update what is shown in display 1310 based on inputs received by generating corresponding outputs based on instructions stored in memory via a non-transitory, computer-readable medium).

Server 1304 and computing device 1302 may transmit and receive content and data such as media content via communication network 1306. For example, server 1304 may be a media content provider, and computing device 1302 may be a smart television configured to download or stream media content, such as a live news broadcast, from server 1304. Control circuitry 1334, 1308 may send and receive commands, requests, and other suitable data through communication network 1306 using communication circuitry 1332, 1326, respectively. Alternatively, control circuitry 1334, 1308 may communicate directly with each other using communication circuitry 1332, 1326, respectively, avoiding communication network 1306.

It is understood that computing device 1302 is not limited to the embodiments and methods shown and described herein. In nonlimiting examples, computing device 1302 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other device, computing equipment, or wireless device, and/or combination of the same, capable of suitably displaying and manipulating media content.

Computing device 1302 receives user input 1314 at input/output circuitry 1312. For example, computing device 1302 may receive a user input such as a user swipe or user touch. It is understood that computing device 1302 is not limited to the embodiments and methods shown and described herein.

User input 1314 may be received from a user selection-capturing interface that is separate from device 1302, such as a remote-control device, trackpad, or any other suitable user movement-sensitive, audio-sensitive or capture devices, or as part of device 1302, such as a touchscreen of display 1310. Transmission of user input 1314 to computing device 1302 may be accomplished using a wired connection, such as an audio cable, USB cable, ethernet cable and the like attached to a corresponding input port at a local device, or may be accomplished using a wireless connection, such as Bluetooth, Wi-Fi, WiMAX, GSM, UTMS, CDMA, TDMA, 8G, 4G, 4G LTE, 5G, or any other suitable wireless transmission protocol. Input/output circuitry 1312 may include a physical input port such as a 12.5 mm (0.4921 inch) audio jack, RCA audio jack, USB port, ethernet port, or any other suitable connection for receiving audio over a wired connection or may include a wireless receiver configured to receive data via Bluetooth, Wi-Fi, WiMAX, GSM, UTMS, CDMA, TDMA, 3G, 4G, 4G LTE, 5G, or other wireless transmission protocols.

Processing circuitry 1318 may receive user input 1314 from input/output circuitry 1312 using communication path 1316. Processing circuitry 1318 may convert or translate the received user input 1314 that may be in the form of audio data, visual data, gestures, or movement to digital signals. In some embodiments, input/output circuitry 1312 performs the translation to digital signals. In some embodiments, processing circuitry 1318 (or processing circuitry 1336, as the case may be) conducts disclosed processes and methods.

Processing circuitry 1318 may provide requests to storage 1322 by communication path 1320. Storage 1322 may provide requested information to processing circuitry 1318 by communication path 1346. Storage 1322 may transfer a request for information to communication circuitry 1326 which may translate or encode the request for information to a format receivable by communication network 1306 before transferring the request for information by communication path 1328. Communication network 1306 may forward the translated or encoded request for information to communication circuitry 1332, by communication path 1330.

At communication circuitry 1332, the translated or encoded request for information, received through communication path 1330, is translated or decoded for processing circuitry 1336, which will provide a response to the request for information based on information available through control circuitry 1334 or storage 1338, or a combination thereof. The response to the request for information is then provided back to communication network 1306 by communication path 1340 in an encoded or translated format such that communication network 1306 forwards the encoded or translated response back to communication circuitry 1326 by communication path 1342.

At communication circuitry 1326, the encoded or translated response to the request for information may be provided directly back to processing circuitry 1318 by communication path 1354 or may be provided to storage 1322 through communication path 1344, which then provides the information to processing circuitry 1318 by communication path 1346. Processing circuitry 1318 may also provide a request for information directly to communication circuitry 1326 through communication path 1352, where storage 1322 responds to an information request (provided through communication path 1320 or 1344) by communication path 1324 or 1346 that storage 1322 does not contain information pertaining to the request from processing circuitry 1318.

Processing circuitry 1318 may process the response to the request received through communication paths 1346 or 1354 and may provide instructions to display 1310 for a notification to be provided to the users through communication path 1348. Display 1310 may incorporate a timer for providing the notification or may rely on inputs through input/output circuitry 1312 from the user, which are forwarded through processing circuitry 1318 through communication path 1348, to determine how long or in what format to provide the notification. When display 1310 determines the display has been completed, a notification may be provided to processing circuitry 1318 through communication path 1350.

The communication paths provided in FIG. 13 between computing device 1302, server 1304, communication network 1306, and all subcomponents depicted are examples and may be modified to reduce processing time or enhance processing capabilities for each step in the processes disclosed herein by one skilled in the art.

Terminology

The terminology used herein is for the purpose of describing particular embodiments only and is not intended to be limiting of the disclosure.

As used herein, the terms "real time," "simultaneous," "substantially on-demand," and the like are understood to be nearly instantaneous but may include delay due to practical limits of the system. Such delays may be on the order of milliseconds or microseconds, depending on the application and nature of the processing. Relatively longer delays (e.g., greater than a millisecond) may result due to communication or processing delays, particularly in remote and cloud computing environments.

As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although at least some embodiments are described as using a plurality of units or modules to perform a process or processes, it is understood that the process or processes may also be performed by one or a plurality of units or modules. Additionally, it is understood that the term controller/control unit may refer to a hardware device that includes a memory and a processor. The memory may be configured to store the units or the modules, and the processor may be specifically configured to execute said units or modules to perform one or more processes which are described herein.

Unless specifically stated or obvious from context, as used herein, the term "about" is understood as within a range of normal tolerance in the art, for example within 2 standard deviations of the mean. "About" may be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The use of the terms "first", "second", "third", and so on, herein, are provided to identify structures or operations, without describing an order of structures or operations, and, to the extent the structures or operations are used in an embodiment, the structures may be provided or the operations may be executed in a different order from the stated order unless a specific order is definitely specified in the context.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory (e.g., a non-transitory, computer-readable medium accessible by an application via control or processing circuitry from storage) including, but not limited to, volatile and non-volatile computer memory or storage devices such as a hard disk, floppy disk, USB drive, DVD, CD, media cards, register memory, processor caches, random access memory (RAM), and the like.

The interfaces, processes, and analysis described may, in some embodiments, be performed by an application. The application may be loaded directly onto each device of any of the systems described or may be stored in a remote server or any memory and processing circuitry accessible to each device in the system. The generation of interfaces and analysis there-behind may be performed at a receiving device, a sending device, or some device or processor therebetween.

The systems and processes discussed herein are intended to be illustrative and not limiting. One skilled in the art would appreciate that the actions of the processes discussed herein may be omitted, modified, combined, and/or rearranged, and any additional actions may be performed without departing from the scope of the invention. More generally, the disclosure herein is meant to provide examples and is not limiting. Only the claims that follow are meant to set bounds as to what the present disclosure includes. Furthermore, it should be noted that the features and limitations described in any some embodiments may be applied to any other embodiment herein, and flowcharts or examples relating to some embodiments may be combined with any other embodiment in a suitable manner, done in different orders, or done in parallel. In addition, the methods and systems described herein may be performed in real time. It should also be noted that the methods and/or systems described herein may be applied to, or used in accordance with, other methods and/or systems.

This specification discloses embodiments, which include, but are not limited to, the following items:

Item 1. A method comprising:
in response to a request to change display of content from a first source to a second source, determining a first decodable frame of the second source before completion of decoding a first segment of the second source;
during the decoding of the second source, generating for display a transition based at least in part on the first decodable frame of the second source; and
in response to the decoding of the first segment of the second source, displaying the second source without the transition.

Item 2. The method of item 1, wherein the first decodable frame of the second source includes a P-picture or a B-picture following a clean random access (CRA) picture.

Item 3. The method of item 1, wherein the decoding occurs for an open group of pictures (GOP), and wherein the first decodable frame of the second source includes an I-picture.

Item 4. The method of item 1, wherein the transition includes:
for a first time period, at least one blank frame and/or an effect based on displayable stored content; and
for a second time period following the first time period, a repetition of the first decodable frame of the second source.

Item 5. The method of item 1, wherein the transition includes:
for a first time period, a fade-out based on at least one frame of the first source; and
for a second time period following the first time period, a repetition and fade-in based on the first decodable frame of the second source.

Item 6. The method of item 1, wherein the transition includes:
for a first time period, at least one frame of the first source;
for a second time period following the first time period, a cross-blend based on the at least one frame of the first source and the first decodable frame of the second source.

Item 7. The method of item 1, wherein the transition includes:
for a first time period, at least one blank frame and/or an effect based on displayable stored content;

for a second time period following the first time period, a repetition of the first decodable frame of the second source; and for a third time period following the second time period, an accelerated display of at least one next frame of the second source after the first decodable frame of the second source.

Item 8. The method of item 1, comprising:
in response to the completion of the decoding process of the second source including arrival of an instantaneous decoder refresh (IDR), displaying the second source without the transition.

Item 9. The method of item 1, wherein the transition includes at least one of:
a minimum number of blank frames,
an effect based on displayable stored content,
a repetition of the first decodable frame of the second source,
a repetition of a frame of the first source,
a fade-out of a frame of the first source,
a fade-in of the first decodable frame of the second source,
a cross-blend of a frame of the first source and a frame of the second source,
a superimposition of a frame of the first source and a frame of the second source,
a dissolving of a frame of the first source or a frame of the second source, or
a change in speed of display of a frame of the first source or a frame of the second source.

Item 10. The method of item 1, wherein the transition includes an effect based on displayable stored content, and wherein the effect includes at least one of:
a pre-downloaded informational image or clip of the second source;
a cover image or clip;
an image based on a channel prediction process;
information about the second source;
an advertisement; or
a thumbnail image.

Item 11. A system comprising:
circuitry configured to:
in response to a request to change display of content from a first source to a second source, determine a first decodable frame of the second source before completion of decoding a first segment of the second source;
during the decoding of the second source, generate for display a transition based at least in part on the first decodable frame of the second source; and
in response to the decoding of the first segment of the second source, display the second source without the transition.

Item 12. The system of item 11, wherein the first decodable frame of the second source includes a P-picture or a B-picture following a clean random access (CRA) picture.

Item 13. The system of item 11, wherein the decoding occurs for an open group of pictures (GOP), and wherein the first decodable frame of the second source includes an I-picture.

Item 14. The system of item 11, wherein the transition includes:
for a first time period, at least one blank frame and/or an effect based on displayable stored content; and
for a second time period following the first time period, a repetition of the first decodable frame of the second source.

Item 15. The system of item 11, wherein the transition includes:
for a first time period, a fade-out based on at least one frame of the first source; and
for a second time period following the first time period, a repetition and fade-in based on the first decodable frame of the second source.

Item 16. The system of item 11, wherein the transition includes:
for a first time period, at least one frame of the first source;
for a second time period following the first time period, a cross-blend based on the at least one frame of the first source and the first decodable frame of the second source.

Item 17. The system of item 11, wherein the transition includes:
for a first time period, at least one blank frame and/or an effect based on displayable stored content;
for a second time period following the first time period, a repetition of the first decodable frame of the second source; and
for a third time period following the second time period, an accelerated display of at least one next frame of the second source after the first decodable frame of the second source.

Item 18. The system of item 11, wherein the circuitry is configured to:
in response to the completion of the decoding process of the second source including arrival of an instantaneous decoder refresh (IDR), display the second source without the transition.

Item 19. The system of item 11, wherein the transition includes at least one of:
a minimum number of blank frames,
an effect based on displayable stored content,
a repetition of the first decodable frame of the second source,
a repetition of a frame of the first source,
a fade-out of a frame of the first source,
a fade-in of the first decodable frame of the second source,
a cross-blend of a frame of the first source and a frame of the second source,
a superimposition of a frame of the first source and a frame of the second source,
a dissolving of a frame of the first source or a frame of the second source, or
a change in speed of display of a frame of the first source or a frame of the second source.

Item 20. The system of item 11, wherein the transition includes an effect based on displayable stored content, and wherein the effect includes at least one of:
a pre-downloaded informational image or clip of the second source;
a cover image or clip;
an image based on a channel prediction process;
information about the second source;
an advertisement; or
a thumbnail image.

Item 21. A non-transitory, computer-readable medium having non-transitory, computer-readable instructions encoded thereon, that, when executed perform:
in response to a request to change display of content from a first source to a second source, determining a first decodable frame of the second source before completion of decoding a first segment of the second source;

during the decoding of the second source, generating for display a transition based at least in part on the first decodable frame of the second source; and in response to the decoding of the first segment of the second source, displaying the second source without the transition.

Item 22. The non-transitory, computer-readable medium of item 21, wherein the first decodable frame of the second source includes a P-picture or a B-picture following a clean random access (CRA) picture.

Item 23. The non-transitory, computer-readable medium of item 21, wherein the decoding occurs for an open group of pictures (GOP), and wherein the first decodable frame of the second source includes an I-picture.

Item 24. The non-transitory, computer-readable medium of item 21, wherein the transition includes:
for a first time period, at least one blank frame and/or an effect based on displayable stored content; and
for a second time period following the first time period, a repetition of the first decodable frame of the second source.

Item 25. The non-transitory, computer-readable medium of item 21, wherein the transition includes:
for a first time period, a fade-out based on at least one frame of the first source; and
for a second time period following the first time period, a repetition and fade-in based on the first decodable frame of the second source.

Item 26. The non-transitory, computer-readable medium of item 21, wherein the transition includes:
for a first time period, at least one frame of the first source;
for a second time period following the first time period, a cross-blend based on the at least one frame of the first source and the first decodable frame of the second source.

Item 27. The non-transitory, computer-readable medium of item 21, wherein the transition includes:
for a first time period, at least one blank frame and/or an effect based on displayable stored content;
for a second time period following the first time period, a repetition of the first decodable frame of the second source; and
for a third time period following the second time period, an accelerated display of at least one next frame of the second source after the first decodable frame of the second source.

Item 28. The non-transitory, computer-readable medium of item 21, comprising:
in response to the completion of the decoding process of the second source including arrival of an instantaneous decoder refresh (IDR), displaying the second source without the transition.

Item 29. The non-transitory, computer-readable medium of item 21, wherein the transition includes at least one of:
a minimum number of blank frames,
an effect based on displayable stored content,
a repetition of the first decodable frame of the second source,
a repetition of a frame of the first source,
a fade-out of a frame of the first source,
a fade-in of the first decodable frame of the second source,
a cross-blend of a frame of the first source and a frame of the second source,
a superimposition of a frame of the first source and a frame of the second source,
a dissolving of a frame of the first source or a frame of the second source, or
a change in speed of display of a frame of the first source or a frame of the second source.

Item 30. The non-transitory, computer-readable medium of item 21, wherein the transition includes an effect based on displayable stored content, and wherein the effect includes at least one of:
a pre-downloaded informational image or clip of the second source;
a cover image or clip;
an image based on a channel prediction process;
information about the second source;
an advertisement; or
a thumbnail image.

Item 31. A device comprising:
means for, in response to a request to change display of content from a first source to a second source, determining a first decodable frame of the second source before completion of decoding a first segment of the second source;
means for, during the decoding of the second source, generating for display a transition based at least in part on the first decodable frame of the second source; and
means for, in response to the decoding of the first segment of the second source, displaying the second source without the transition.

Item 32. The device of item 31, wherein the first decodable frame of the second source includes a P-picture or a B-picture following a clean random access (CRA) picture.

Item 33. The device of item 31, wherein the decoding occurs for an open group of pictures (GOP), and wherein the first decodable frame of the second source includes an I-picture.

Item 34. The device of item 31, wherein the transition includes:
for a first time period, at least one blank frame and/or an effect based on displayable stored content; and
for a second time period following the first time period, a repetition of the first decodable frame of the second source.

Item 35. The device of item 31, wherein the transition includes:
for a first time period, a fade-out based on at least one frame of the first source; and
for a second time period following the first time period, a repetition and fade-in based on the first decodable frame of the second source.

Item 36. The device of item 31, wherein the transition includes:
for a first time period, at least one frame of the first source;
for a second time period following the first time period, a cross-blend based on the at least one frame of the first source and the first decodable frame of the second source.

Item 37. The device of item 31, wherein the transition includes:
for a first time period, at least one blank frame and/or an effect based on displayable stored content;
for a second time period following the first time period, a repetition of the first decodable frame of the second source; and
for a third time period following the second time period, an accelerated display of at least one next frame of the second source after the first decodable frame of the second source.

Item 38. The device of item 31, comprising:
means for, in response to the completion of the decoding process of the second source including arrival of an instantaneous decoder refresh (IDR), displaying the second source without the transition.

Item 39. The device of item 31, wherein the transition includes at least one of:
 a minimum number of blank frames,
 an effect based on displayable stored content,
 a repetition of the first decodable frame of the second source,
 a repetition of a frame of the first source,
 a fade-out of a frame of the first source,
 a fade-in of the first decodable frame of the second source,
 a cross-blend of a frame of the first source and a frame of the second source,
 a superimposition of a frame of the first source and a frame of the second source,
 a dissolving of a frame of the first source or a frame of the second source, or
 a change in speed of display of a frame of the first source or a frame of the second source.

Item 40. The device of item 31, wherein the transition includes an effect based on displayable stored content, and wherein the effect includes at least one of:
 a pre-downloaded informational image or clip of the second source;
 a cover image or clip;
 an image based on a channel prediction process;
 information about the second source;
 an advertisement; or
 a thumbnail image.

This description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
 in response to a request to change display of content from a first source to a second source, determining, at a client device, a first decodable frame of the second source before completion of decoding a first segment of the second source;
 during the decoding of the second source, generating, at the client device, for display a transition based at least in part on the first decodable frame of the second source; and
 in response to the decoding of the first segment of the second source, displaying, at the client device, the second source without the transition.

2. The method of claim 1, wherein the first decodable frame of the second source includes a P-picture or a B-picture following a clean random access (CRA) picture.

3. The method of claim 1, wherein the decoding occurs for an open group of pictures (GOP), and wherein the first decodable frame of the second source includes an I-picture.

4. The method of claim 1, wherein the transition includes at least one of:
 for a first time period, at least one blank frame and/or an effect based on displayable stored content, and
 for a second time period following the first time period, a repetition of the first decodable frame of the second source,
 a minimum number of blank frames,
 an effect based on displayable stored content,
 a repetition of the first decodable frame of the second source,
 a repetition of a frame of the first source,
 a fade-out of a frame of the first source,
 a fade-in of the first decodable frame of the second source,
 a cross-blend of a frame of the first source and a frame of the second source,
 a superimposition of a frame of the first source and a frame of the second source,
 a dissolving of a frame of the first source or a frame of the second source,
 a change in speed of display of a frame of the first source or a frame of the second source, or
 an effect based on displayable stored content, and wherein the effect includes at least one of:
  a pre-downloaded informational image or clip of the second source;
  a cover image or clip;
  an image based on a channel prediction process;
  information about the second source;
  an advertisement; or
  a thumbnail image.

5. The method of claim 1, wherein the transition includes:
 for a first time period, a fade-out based on at least one frame of the first source; and
 for a second time period following the first time period, a repetition and fade-in based on the first decodable frame of the second source.

6. The method of claim 1, wherein the transition includes:
 for a first time period, at least one frame of the first source;
 for a second time period following the first time period, a cross-blend based on the at least one frame of the first source and the first decodable frame of the second source.

7. The method of claim 1, wherein the transition includes:
 for a first time period, at least one blank frame and/or an effect based on displayable stored content;
 for a second time period following the first time period, a repetition of the first decodable frame of the second source; and
 for a third time period following the second time period, an accelerated display of at least one next frame of the second source after the first decodable frame of the second source.

8. The method of claim 1, comprising:
 in response to the completion of the decoding process of the second source including arrival of an instantaneous decoder refresh (IDR), displaying the second source without the transition.

9. The method of claim 1, wherein the determining, the generating, and the displaying occur without receiving information from a server.

10. The method of claim 1, wherein the determining occurs before an instantaneous decoding refresh (IDR), and before decoding any I-picture existing in the first segment prior to the IDR.

11. The method of claim 1, wherein the transition comprises at least one blank frame and/or an effect comprising modification of the first decodable frame of the second source determined before completion of the decoding of the first segment of the second source.

12. The method of claim 1, wherein the display is in response to completion of the decoding.

13. A system comprising:
 a client device comprising circuitry configured to:
  in response to a request to change display of content from a first source to a second source, determine, at the client device, a first decodable frame of the second source before completion of decoding a first segment of the second source;

during the decoding of the second source, generate, at the client device, for display a transition based at least in part on the first decodable frame of the second source; and in response to the decoding of the first segment of the second source, display, at the client device, the second source without the transition.

14. The system of claim 13, wherein the first decodable frame of the second source includes a P-picture or a B-picture following a clean random access (CRA) picture.

15. The system of claim 13, wherein the decoding occurs for an open group of pictures (GOP), and wherein the first decodable frame of the second source includes an I-picture.

16. The system of claim 13, wherein the transition includes at least one of:
   for a first time period, at least one blank frame and/or an effect based on displayable stored content, and, for a second time period following the first time period, a repetition of the first decodable frame of the second source,
   a minimum number of blank frames,
   an effect based on displayable stored content,
   a repetition of the first decodable frame of the second source,
   a repetition of a frame of the first source,
   a fade-out of a frame of the first source,
   a fade-in of the first decodable frame of the second source,
   a cross-blend of a frame of the first source and a frame of the second source,
   a superimposition of a frame of the first source and a frame of the second source,
   a dissolving of a frame of the first source or a frame of the second source,
   a change in speed of display of a frame of the first source or a frame of the second source, or
   an effect based on displayable stored content, and wherein the effect includes at least one of:
      a pre-downloaded informational image or clip of the second source;
      a cover image or clip;
      an image based on a channel prediction process;
      information about the second source;
      an advertisement; or
      a thumbnail image.

17. The system of claim 13, wherein the transition includes:
   for a first time period, a fade-out based on at least one frame of the first source; and
   for a second time period following the first time period, a repetition and fade-in based on the first decodable frame of the second source.

18. The system of claim 13, wherein the transition includes:
   for a first time period, at least one frame of the first source;
   for a second time period following the first time period, a cross-blend based on the at least one frame of the first source and the first decodable frame of the second source.

19. The system of claim 13, wherein the transition includes:
   for a first time period, at least one blank frame and/or an effect based on displayable stored content;
   for a second time period following the first time period, a repetition of the first decodable frame of the second source; and
   for a third time period following the second time period, an accelerated display of at least one next frame of the second source after the first decodable frame of the second source.

20. The system of claim 13, wherein the circuitry is configured to:
   in response to the completion of the decoding process of the second source including arrival of an instantaneous decoder refresh (IDR), display the second source without the transition.

* * * * *